US006979797B2

(12) United States Patent
Rivas et al.

(10) Patent No.: US 6,979,797 B2
(45) Date of Patent: Dec. 27, 2005

(54) SLOTTED SUBSTRATES AND METHODS AND SYSTEMS FOR FORMING SAME

(75) Inventors: Rio T. Rivas, Corvallis, OR (US); Shen Buswell, Monmouth, OR (US); Mehrgan Khavari, Corvallis, OR (US); Jeffrey R. Pollard, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 705 days.

(21) Appl. No.: 10/061,828

(22) Filed: Jan. 31, 2002

(65) Prior Publication Data

US 2003/0140497 A1 Jul. 31, 2003

(51) Int. Cl.[7] .................................................. B23K 26/36

(52) U.S. Cl. .................................................. 219/121.69

(58) Field of Search .......................... 219/121.6, 121.67, 219/121.68, 121.69, 121.7, 121.71, 121.72, 121.85

(56) References Cited

U.S. PATENT DOCUMENTS

| | | | |
|---|---|---|---|
| 5,441,593 A | * 8/1995 | Baughman et al. | ........... 216/27 |
| 5,455,998 A | 10/1995 | Miyazono et al. | |

FOREIGN PATENT DOCUMENTS

| | | |
|---|---|---|
| EP | 0 609 012 | 8/1994 |
| EP | 0 764 533 | 3/1997 |

* cited by examiner

*Primary Examiner*—Samuel M. Heinrich

(57) ABSTRACT

Methods and systems for forming slots in a substrate that has opposing first and second surfaces. The method makes a laser cut through either the first or second surface of the substrate sufficient to form a first trench. Material is also removed through the other of the first and second surfaces effective to form, in combination with the laser cut, a slot. At least a portion of the slot passes entirely through the substrate, and the slot has an aspect ratio greater than or equal to 1.

45 Claims, 12 Drawing Sheets

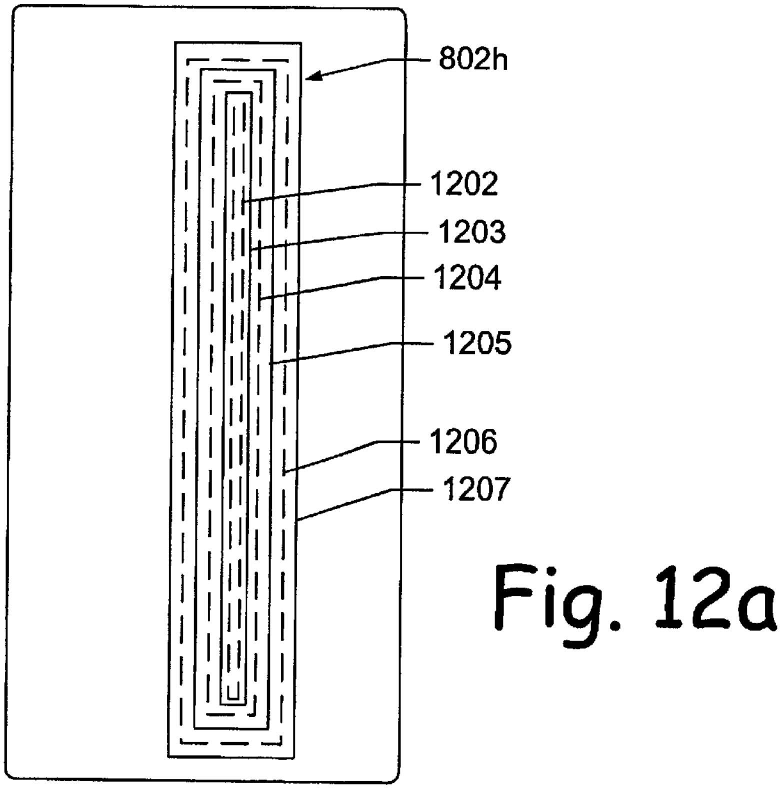
Fig. 12a
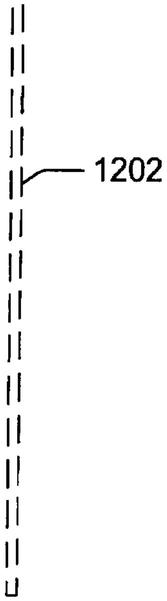
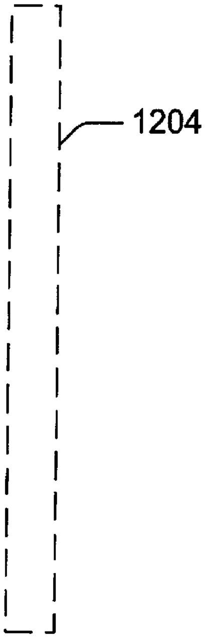
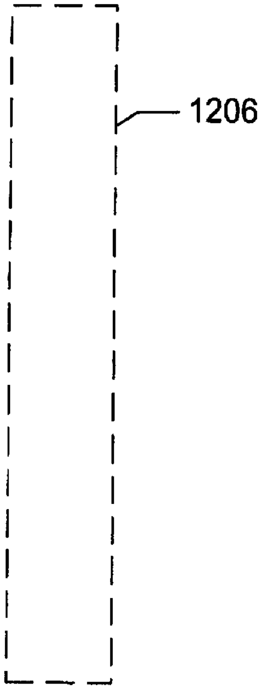
Fig. 12b Fig. 12c Fig. 12d

SLOTTED SUBSTRATES AND METHODS AND SYSTEMS FOR FORMING SAME

BACKGROUND OF THE INVENTION

Inkjet printers have become ubiquitous in society. These printers provide many desirable characteristics at an affordable price. However, the desire for ever more features at ever-lower prices continues to press manufacturers to improve efficiencies. Consumers want ever higher print image resolution, realistic colors, and increased pages or printing per minute. One way of achieving consumer demands is by improving the print head and its method of manufacture. Currently, the print head is time consuming and costly to make.

Accordingly, the present invention arose out of a desire to provide fast and economical methods for forming print heads and other fluid ejecting devices having desirable characteristics.

BRIEF DESCRIPTION OF THE DRAWINGS

The same components are used throughout the drawings to reference like features and components.

FIG. 12*a* is a top view of a substrate in accordance with one exemplary embodiment.

FIG. 12*b* is a top view of an exemplary geometrical pattern in accordance with one exemplary embodiment.

FIG. 12*c* is a top view of an exemplary geometrical pattern in accordance with one exemplary embodiment.

FIG. 12*d* is a top view of an exemplary geometrical pattern in accordance with one exemplary embodiment.

DETAILED DESCRIPTION OF THE PREFERRED EMBODIMENTS OVERVIEW

The embodiments described below pertain to methods and systems for forming slots in a semiconductor substrate. One embodiment of this process will be described in the context of forming fluid feed slots in a print head die substrate. As commonly used in print head dies, the semiconductor substrate often has microelectronics incorporated within, deposited over, and/or supported by the substrate. The fluid feed slot(s) allow fluid, commonly ink, to be supplied to fluid ejecting elements contained in ejection chambers within the print head. The fluid ejection elements commonly comprise heating elements or firing resistors that heat fluid causing increased pressure in the ejection chamber. A portion of that fluid can be ejected through a firing nozzle with the ejected fluid being replaced by fluid from the fluid feed slot.

The fluid feed slot can be made in various ways. In one embodiment material is removed from the substrate by laser machining a trench through a first substrate surface. A second trench can be formed by various techniques, such as sand drilling, so that the first and second trenches meet to form a slot through the substrate. In some embodiments, the trenches are formed so that they are about equal depth to ensure that they meet at about the middle of the substrate's thickness. Slots made this way can be very narrow and as long as desired. Narrow slots remove less material and have beneficial strength characteristics that can reduce die fragility. This, in turn, can allow slots to be positioned closer together on the die.

Other embodiments include features that reduce the accumulation of bubbles in the slot. Bubbles can result from the fluid ejection process and can occlude fluid feed if they accumulate in the slot. Various techniques can be utilized to promote bubble migration away from the thin film surface where they are most prone to blocking fluid flow.

Although exemplary embodiments described herein are described in the context of providing dies for use in inkjet printers, it is recognized and understood that the techniques described herein can be applicable to other applications where slots are desired to be formed in a substrate.

The various components described below may not be illustrated accurately as far as their size is concerned. Rather, the included figures are intended as diagrammatic representations to illustrate to the reader various inventive principles that are described herein.

Exemplary Printer System

Figure 1:
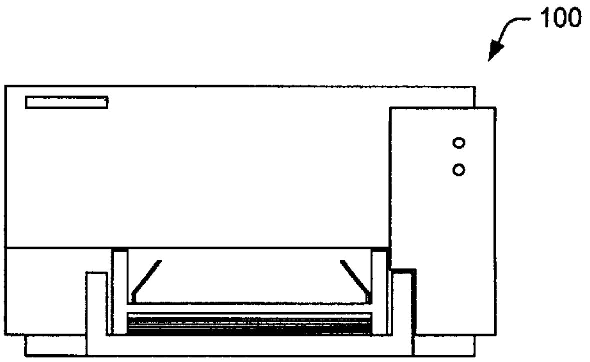
FIG. 1 is a front elevational view of an exemplary printer.

FIG. 1 shows one embodiment of a printer 100, embodied in the form of an inkjet printer. The printer 100 can be, but need not be, representative of an inkjet printer series manufactured by the Hewlett-Packard Company under the trademark "DeskJet". The inkjet printer 100 is capable of printing in black-and-white and/or in color. The term "printer" refers to any type of printer or printing device that ejects fluid or other pigmented materials onto a print media. Though an inkjet printer is shown for exemplary purposes, it is noted that aspects of the described embodiments can be implemented in other forms of printing devices that employ inkjet printing elements or other fluid ejecting devices, such as facsimile machines, photocopiers, and the like.

Figure 2:
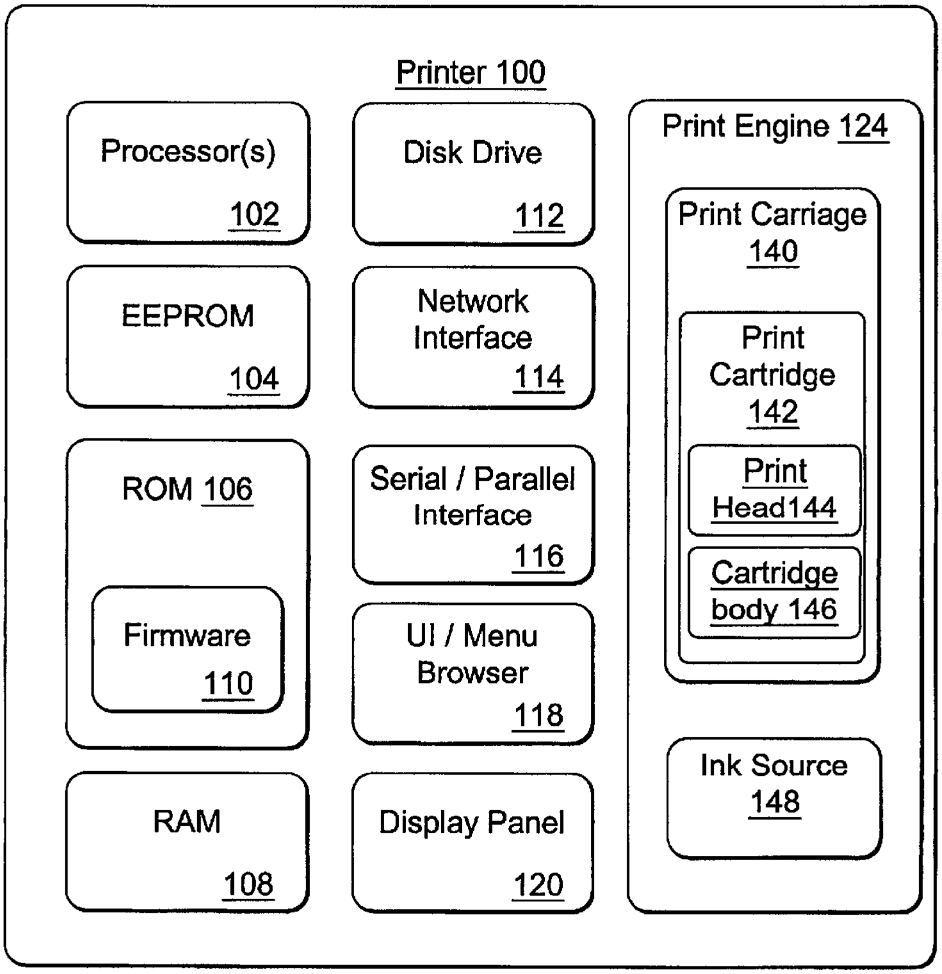
FIG. 2 is a block diagram that illustrates various components of an exemplary printer.

FIG. 2 illustrates various components in one embodiment of printer 100 that can be utilized to implement the inventive techniques described herein. Printer 100 can include one or more processors 102. The processor 102 controls various printer operations, such as media handling and carriage movement for linear positioning of the print head over a print media (e.g., paper, transparency, etc.).

Printer 100 can have an electrically erasable programmable read-only memory (EEPROM) 104, ROM 106 (non-erasable), and/or a random access memory (RAM) 108. Although printer 100 is illustrated having an EEPROM 104 and ROM 106, a particular printer may only include one of the memory components. Additionally, although not shown, a system bus typically connects the various components within the printing device 100.

The printer 100 can also have a firmware component 110 that is implemented as a permanent memory module stored on ROM 106, in one embodiment. The firmware 110 is programmed and tested like software, and is distributed with the printer 100. The firmware 110 can be implemented to coordinate operations of the hardware within printer 100 and contains programming constructs used to perform such operations.

In this embodiment, processor(s) 102 process various instructions to control the operation of the printer 100 and to communicate with other electronic and computing devices. The memory components, EEPROM 104, ROM 106, and RAM 108, store various information and/or data such as configuration information, fonts, templates, data being printed, and menu structure information. Although not shown in this embodiment, a particular printer can also include a flash memory device in place of or in addition to EEPROM 104 and ROM 106.

Printer 100 can also include a disk drive 112, a network interface 114, and a serial/parallel interface 116 as shown in the embodiment of FIG. 2. Disk drive 112 provides additional storage for data being printed or other information maintained by the printer 100. Although printer 100 is illustrated having both RAM 108 and a disk drive 112, a particular printer may include either RAM 108 or disk drive 112, depending on the storage needs of the printer. For example, an inexpensive printer may include a small amount of RAM 108 and no disk drive 112, thereby reducing the manufacturing cost of the printer.

Network interface 114 provides a connection between printer 100 and a data communication network in the embodiment shown. The network interface 114 allows devices coupled to a common data communication network to send print jobs, menu data, and other information to printer 100 via the network. Similarly, serial/parallel interface 116 provides a data communication path directly between printer 100 and another electronic or computing device. Although printer 100 is illustrated having a network interface 114 and serial/parallel interface 116, a particular printer may only include one interface component.

Printer 100 can also include a user interface and menu browser 118, and a display panel 120 as shown in the embodiment of FIG. 2. The user interface and menu browser 118 allows a user of the printer 100 to navigate the printer's menu structure. User interface 118 can be indicators or a series of buttons, switches, or other selectable controls that are manipulated by a user of the printer. Display panel 120 is a graphical display that provides information regarding the status of the printer 100 and the current options available to a user through the menu structure.

This embodiment of printer 100 also includes a print engine 124 that includes mechanisms arranged to selectively apply fluid (e.g., liquid ink) to a print media such as paper, plastic, fabric, and the like in accordance with print data corresponding to a print job.

The print engine 124 can comprise a print carriage 140. The print carriage can contain one or more print cartridges 142 that comprise a print head 144 and a print cartridge body 146. Additionally, the print engine can comprise one or more fluid sources 148 for providing fluid to the print cartridges and ultimately to a print media via the print heads.

Exemplary Embodiments and Methods

Figure 4:
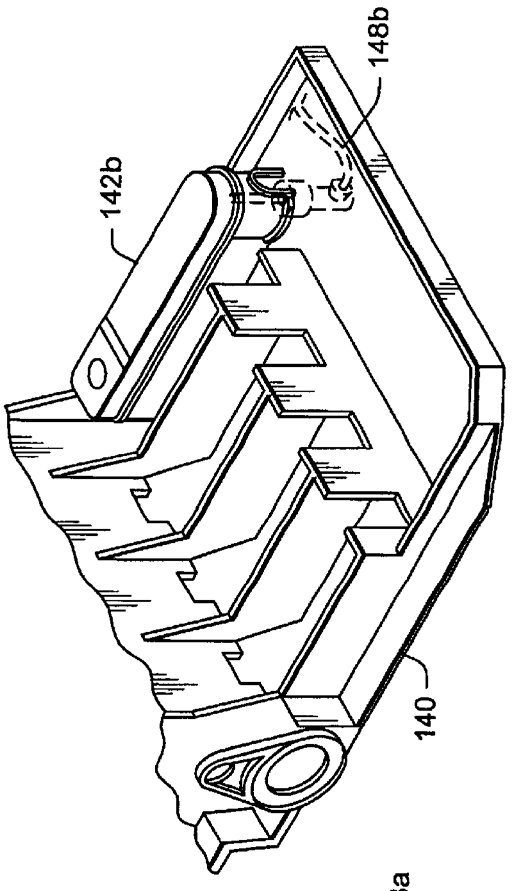
FIGS. 3 and 4 each show a perspective view of a print carriage in accordance with one exemplary embodiment.
Figure 3:
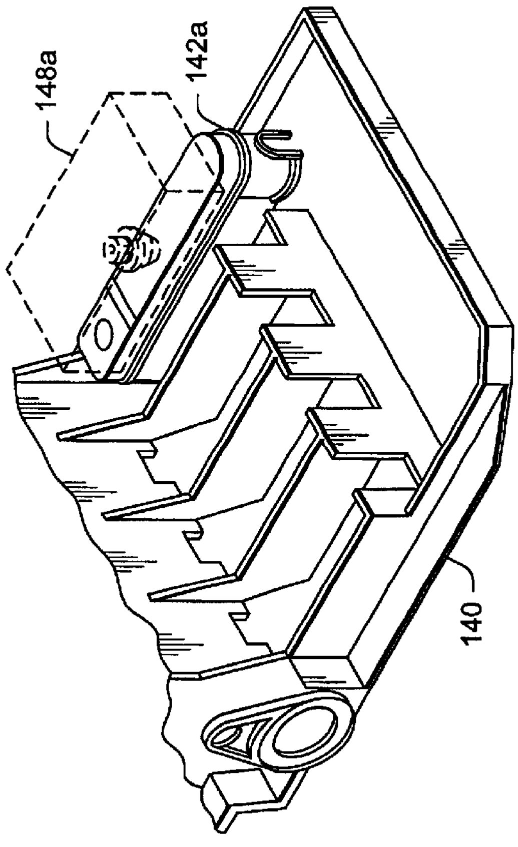

FIGS. 3 and 4 show exemplary print cartridges (142*a* and 142*b*) in a print carriage 140. The print carriages depicted are configured to hold four print cartridges although only one print cartridge is shown. Many other exemplary configurations are possible. FIG. 3 shows the print cartridge 142*a* configured for an up connect to a fluid source 148*a*, while FIG. 4 shows print cartridge 142*b* configured to down connect to a fluid source 148*b*. Other exemplary configurations are possible including but not limited the print cartridge having its own self-contained fluid supply.

Figure 5:
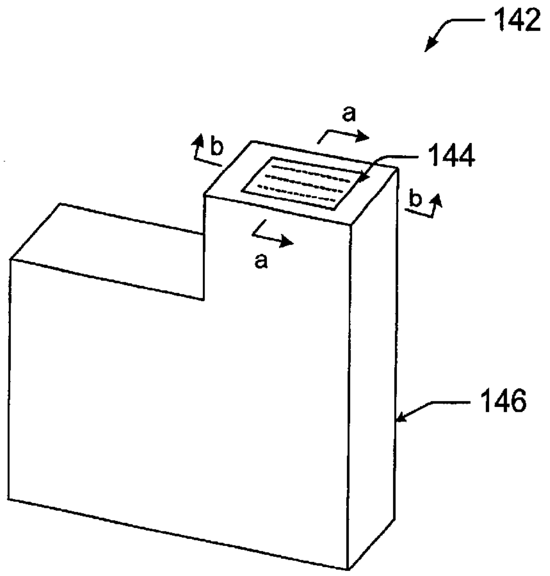
FIG. 5 is a perspective view of a print cartridge in accordance with one exemplary embodiment.

FIG. 5 shows an exemplary print cartridge 142. The print cartridge is comprised of the print head 144 and the cartridge body 146. Other exemplary configurations will be recognized by those of skill in the art.

Figure 6:
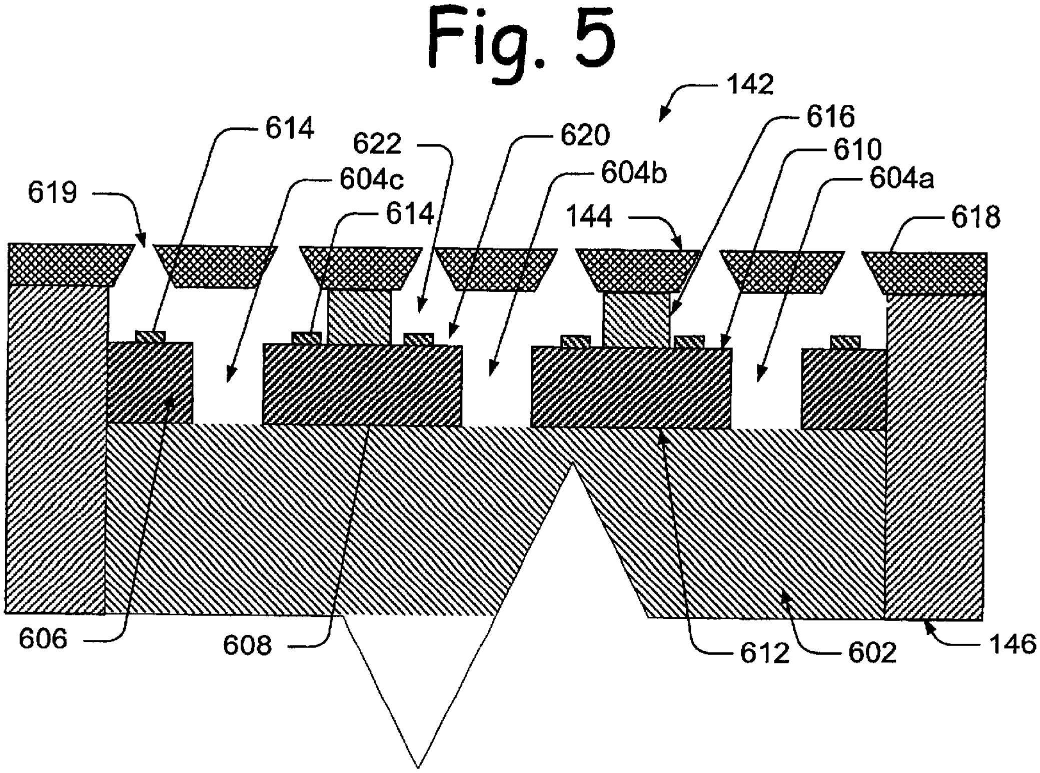
FIG. 6 is a cross-sectional view of a top of a print cartridge in accordance with one exemplary embodiment.

FIG. 6 shows a cross-sectional representation of a portion of the exemplary print cartridge 142 taken along line a—a in FIG. 5. It shows the cartridge body 146 containing fluid 602 for supply to the print head 144. In this embodiment, the print cartridge is configured to supply one color of fluid or ink to the print head. In this embodiment, a number of different fluid feed slots are provided, with three exemplary slots being shown at 604*a*, 604*b*, and 604*c*. Other exemplary embodiments can divide the fluid supply so that each of the three fluid feed slots 604*a*–604*c* receives a separate fluid supply. Other exemplary print heads can utilize less or more slots than the three shown here.

The various fluid feed slots pass through portions of a substrate 606 in this embodiment. Silicon can be a suitable substrate, for this embodiment. In some embodiments, substrate 606 comprises a crystalline substrate such as single crystalline silicon or polycrystalline silicon. Examples of other suitable substrates include, among others, gallium arsenide, glass, silica, ceramics or a semi conducting material. The substrate can comprise various configurations as will be recognized by one of skill in the art. In this exemplary embodiment, the substrate comprises a base layer, shown here as silicon substrate 608. The silicon substrate has a first surface 610 and a second surface 612. Positioned above the silicon substrate are the independently controllable fluid drop generators that in this embodiment comprise firing resistors 614. In this exemplary embodiment, the resistors are part of a stack of thin film layers on top of the silicon substrate 608. The thin film layers can further comprise a barrier layer 616. The barrier layer can comprise, among other things, a photo-resist polymer substrate. Above the barrier layer is an orifice plate 618 that can comprise, but is not limited to a nickel substrate. The orifice plate has a plurality of nozzles 619 through which fluid heated by the various resistors can be ejected for printing on a print media (not shown). The various layers can be formed, deposited, or attached upon the preceding layers. The configuration given here is but one possible configuration. For example, in an alternative embodiment, the orifice plate and barrier layer are integral.

The exemplary print cartridge shown in FIGS. 5 and 6 is upside down from the common orientation during usage. When positioned for use, fluid can flow from the cartridge body 146 into one or more of the slots 604*a*–604*c*. From the slots, the fluid can travel through a fluid feed passageway 620 that leads to a firing chamber 622. A firing chamber can be comprised of a firing resistor, a nozzle, and a given volume of space therein. Other configurations are also possible. When an electrical current is passed through the resistor in a given firing chamber, the fluid can be heated to its boiling point so that it expands to eject a portion of the fluid from the nozzle 619. The ejected fluid can then be replaced by additional fluid from the fluid feed passageway 620.

Figure 7:
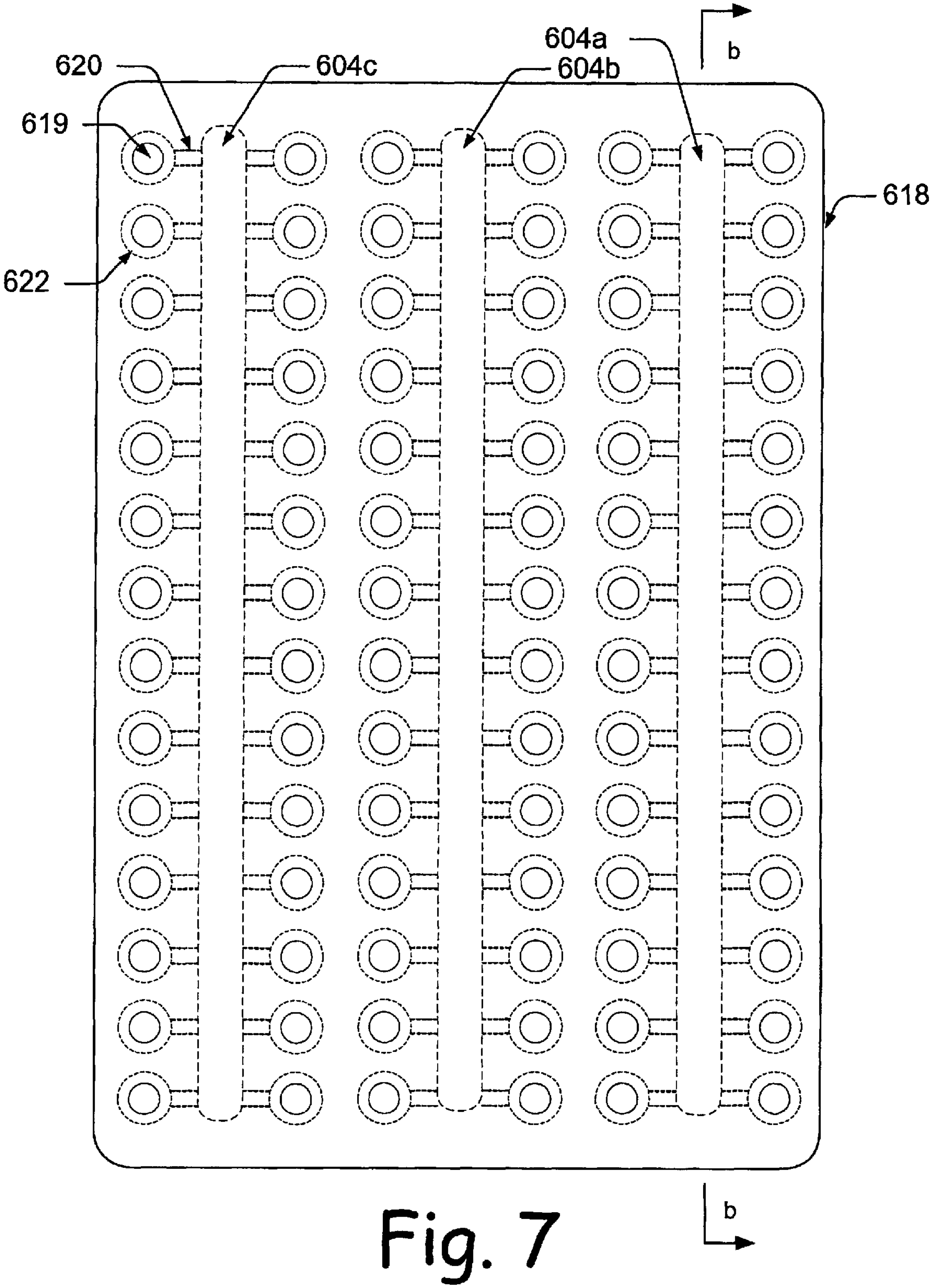
FIG. 7 is a top view of a print head in accordance with one exemplary embodiment.

The embodiment of FIG. 7 shows a view from above the thin-film surface of a substrate incorporated into a print head. The substrate is covered by the orifice plate 618 with underlying structures of the print head indicated in dashed lines in this embodiment. The orifice plate is shown with numerous nozzles 619. Below each nozzle lies the firing chamber 622 that is connected to a fluid feed passageway (feed channel) 620 and then to slot 604*a–c*. The slots are illustrated in this embodiment as an elliptical configuration when viewed from above the first surface of the substrate. Other exemplary geometries include rectangular among others.

FIGS. 8*a*–8*f* and 9*a*–9*h* show two exemplary embodiments in which portions of the substrate are removed to form one or more slots through the substrate. The illustrated substrate 606 has a thickness t. The described embodiments can work satisfactorily with various thicknesses of substrate. For example, in the specific described embodiments, the thickness can range from less than about 100 microns to at least about 2000 microns. Other exemplary embodiments can be outside of this range. The thickness of the substrate t in some exemplary embodiments can be about 675 microns.

Figure 8A:
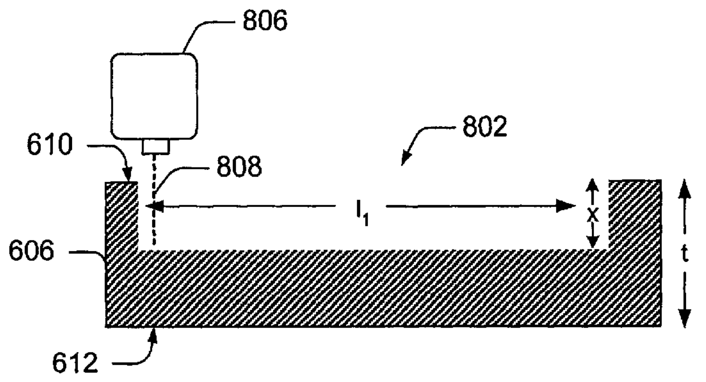
FIGS. 8*a*–8*f* and 9*a*–9*h* each show a cross-sectional view of a substrate in accordance with one exemplary embodiment.
Figure 8B:
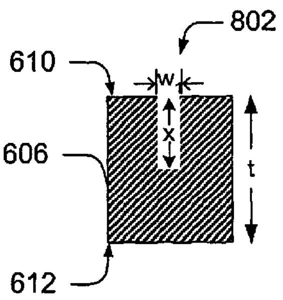

The slots can comprise a first trench 802 that originates from a first side of the substrate, and a second trench 804 (shown FIG. 8*c*) that originates from the second side of the substrate. For ease of appreciating these trenches, the figures are shown in corresponding pairs. For example, FIG. 8*a* is a portion of a cross-section taken along line b—b indicated in FIGS. 5 and 7, and shows a length $l_1$ and depth x of the first trench. FIG. 8*b* is a portion of a cross section taken along line a—a in FIG. 5. FIG. 8*b* shows a width $w_1$ of the trench 802 and the same depth x shown in FIG. 8*a* of the first trench 802.

In the illustrated embodiments, the length lies along the long axis of the trench and the width lies along the short axis, transverse the long axis. FIGS. 8*c* and 8*d* and FIGS. 8*e* and 8*f* have similar relationships showing corresponding cross sections of the length and width.

Referring to FIG. 8*a*, a first trench 802 is formed by laser machining a portion of the substrate using a suitable laser machining tool 806. In this embodiment, the laser machining tool has a laser source that generates a laser beam 808 that can machine, ablate, or otherwise remove substrate material.

Many satisfactory laser machines can be used as will be recognized by one of skill in the art. In this exemplary embodiment, the laser machine has a laser source that generates a UV laser beam. One suitable laser machine is a UV laser machine called a Xise 200 Laser Machining Tool, manufactured by Xsil of Dublin, Ireland. In this embodiment, a suitable laser source can use power in the range of about 2 to 100 Watts. In one particular embodiment, the laser source power can be about 4.5 Watts and can have a wavelength of (1060 nm)/n or (1053 nm)/n, where n=2, 3 or 4. In a specific embodiment, the UV wavelength can be less than about 400 nm, or, in one particular example, about 355 nm. Any suitable pulse width can be employed. In this particular example, the pulse width of the laser beam is about 15 ns, and the repetition rate is about 30 kHz. Additionally, the laser beam can have a diameter of about 5 to 100 microns in this embodiment. In one particular example, the diameter is about 17 microns. Further, the laser machine can have a debris extraction system to remove any debris resulting from the laser machining in this embodiment.

To effectuate substrate removal in a desired pattern, the laser beam passes over the substrate in at least one of several various configurations in this embodiment. For example, the laser beam can be passed over the substrate a single time or multiple times. Additionally, the laser beam can make multiple passes over certain substrate areas and a single pass over other areas. The speed at which the beam is moved over the substrate, as well as the focus of the beam can also be varied to achieve different results depending on the application.

The trench 802 shown in FIG. 8*a* extends through approximately 50 percent of the thickness of the substrate as indicated by the depth x, and thus has a depth of about 335 microns in this particular example. In other embodiments, the trench can be any depth from less than about 10 microns to a depth that passes through the entire thickness t. In a most particular embodiment however, the depth x of the trench can be from about 25 percent to about 75 percent of the thickness of the substrate.

Figure 8C:
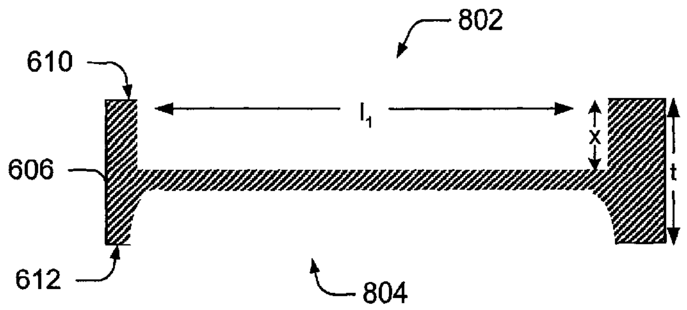
Figure 8D:
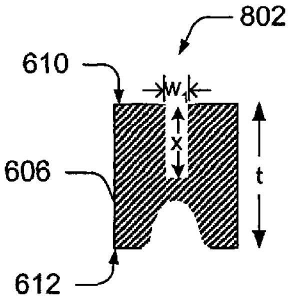

FIG. 8*c* shows a partially completed second trench 804 that is formed from the substrate's second side or surface 612. In various embodiments, the trench can be formed by removing substrate material through the second surface. In this example, sand drilling can be used to form the second trench. Sand drilling is a mechanical cutting process where target material is removed by particles, such as aluminum oxide, delivered from a high pressure air flow system. Sand drilling is also referred to as sand blasting, abrasive sand machining, and sand abrasion.

As an alternative to sand drilling, other exemplary embodiments can use one or more of the following techniques to form the second trench: laser machining, dry etching, wet etching, mechanical machining, and others. Mechanical machining can include the use of various saws and drills that are commonly used to remove substrate material.

Figure 8E:
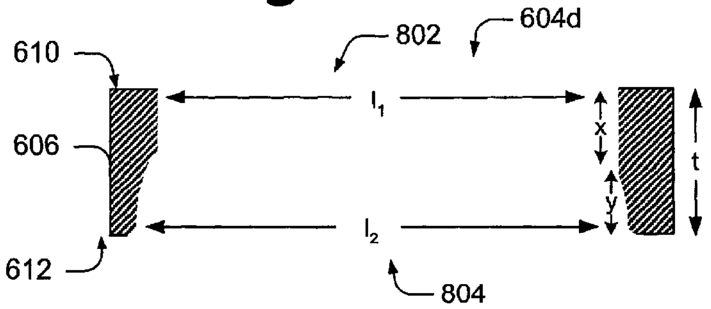
Figure 8F:
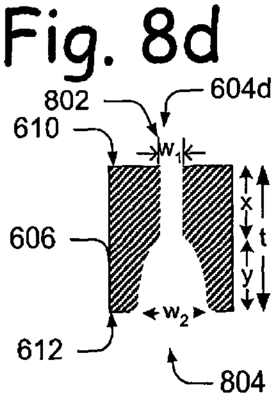

FIGS. 8*e*–8*f* show a finished second trench having a length $l_2$, a width $w_2$ and a depth y. The trench intercepts or otherwise joins with a portion of the first trench. The combination of the two trenches forms a slot 604*d* that extends through the thickness of the substrate and through which a fluid such as fluid can flow. So for at least a portion of the substrate, the depths (x and y) of the two trenches, when taken together, equal the thickness t. As shown in this exemplary embodiment and as best viewed in FIG. 8*e*, the second trench intercepts the entire length $l_1$ of the first trench. Other exemplary embodiments can have less than the entirety of the length of the first trench intercepted by the second trench. An example of such a relationship will be discussed in regard to FIGS. 11*a*–11*d*. Additionally, as can be appreciated from FIG. 8*e*, the second trench can be longer than the first trench so that it encompasses a portion of the first trench for its entire length within the second trench.

The exemplary embodiment, shown in FIG. 8*f*, has a slot 604*d* formed from a first trench 802 having generally planar side walls and a second trench 804 having generally concave side walls. In this exemplary embodiment, the maximum width $w_1$ of the first trench is less than the maximum width $w_2$ of the second trench. Other exemplary embodiments can utilize different configurations.

Although the described embodiments illustrate only removing material from the substrate to form the desired trenches, intermediate steps in some embodiments can actually add material to the substrate. For example, materials might be deposited, through deposition techniques, as part of the slot formation sequence and then be either partially or completely removed.

Alternatively, some exemplary embodiments can utilize one or more additional procedures beyond those described above and below to clean or otherwise improve a slot. For example, in one exemplary embodiment, a first trench can be made by dry etching from one side and a second trench can be laser machined from the other side until it intercepts the first trench to form a slot. Another additional procedure, such as sand drilling, can be utilized to clean up or remove any debris left from the slot formation process in this exemplary embodiment. The clean up procedure can be performed once the slot is formed as described in this example, or alternatively, can be done after some material has been removed, but before the slot is completely formed.

The dimensions of the trenches can be modified to make a through slot of any desired length and/or width. For example, the length of the slot can be made short enough so that it resembles a hole or via.

The process of forming a portion of the slot from each side of the substrate can provide many desirable advantages. One advantage pertains to the dimensions of the slot width. For example, a greatly reduced slot width can be formed using the techniques described above, as compared with the width of a slot that is formed entirely from a single side.

For example, on a standard 675 micron thick substrate, a first trench of about 80 microns in width can be laser machined through about one-half of the thickness of the substrate from a first side. The remainder of the thickness of the substrate can be removed from the second side by sand drilling.

In an exemplary embodiment where the first side comprises the thin film side, the maximum width of the slot can be located on a portion of the backside trench near or at the backside surface and can be about 300 microns. In one exemplary embodiment, the maximum width of the backside trench is about 240 microns where the front side width is about 80 microns. This allows a maximum trench width of about 300 percent of the width of the thin-film side of the slot. Viewed another way, the maximum width of the through slot is about 50 percent or less of the thickness of the substrate. In this exemplary embodiment, the aspect ratio is about 2.8, where the aspect ratio equals the substrate thickness divided by the slot width. The described techniques allow much higher aspect ratios to be achieved as desired.

Conversely, forming a slot using sand drilling alone can form a slot with a width of about 180 microns on the thin film side and a backside width of about 650 microns for a substrate of about 670 microns thickness. Thus, the maximum slot width is approximately equal to the substrate thickness, so the aspect ratio is approximately 1. A slot, sand drilled from a single surface, often removes a large amount of substrate material making the remaining substrate more fragile. Further, the wide backside trench leads to an undesirably large distance between adjacent slots on a multi-slot substrate or die.

Forming a significant portion of the slot from each side not only allows a narrower slot width than sand drilling alone, but can also form a slot of much better quality. For example, a slot that is sand drilled entirely from the backside creates stresses on the underside of the thin film layer on the front side of the substrate before "breakthrough" occurs. Breakthrough is the moment when the entire thickness of a given portion of the substrate has been removed. When breakthrough occurs at the thin film side, large stress forces can often weaken the substrate and associated microelectronics, and often can, when completed by sand drilling, cause large chips of at least about 45–50 microns to be broken from the sides of the slot. This chipping often hinders the print quality of the die.

In one particular embodiment, when laser machining is conducted first from the first side through about one half of the substrate, breakthrough from the second side occurs generally in the middle of the substrate. Consequently, chipping is both reduced at this mid location, and less critical than when on the thin film side/surface. Further, in this embodiment, the substrate is less susceptible to stress induced breakage when the breakthrough occurs toward the center of the substrate's thickness. Also, in this embodiment, laser machining can create trenches with much less variation than sand drilling. In one embodiment, laser machining can cut a trench within about 7 microns of a desired location and can have less than about 4 microns of variance along a given laser cut trench. This small variance can be especially valuable on the thin-film portion where such a precisely formed trench can be advantageous to printer function. The laser also allows increased variation in trench shape. Both of these properties can be advantageous and will be discussed in more detail below.

The laser cutting process is very precise, but its efficiency can diminish when making deep cuts, such as cutting all the way through a substrate from one side. By laser cutting a portion of the trench from one side in combination with removing material from the other side, the advantages can be increased and the disadvantages reduced.

FIGS. 9*a*–9*h* show an exemplary embodiment, where the laser is used to make a stair stepped or graduated trench from one side after a first trench is made from the other side.

Figure 9A:
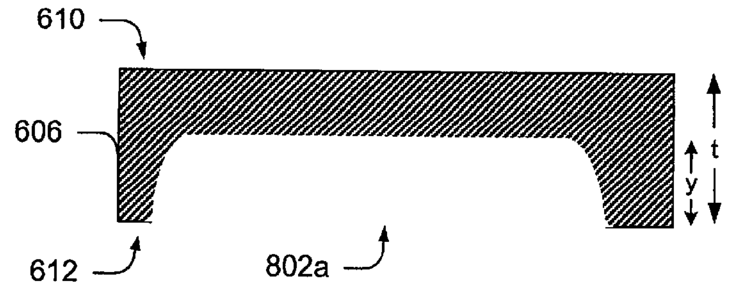
Figure 9B:
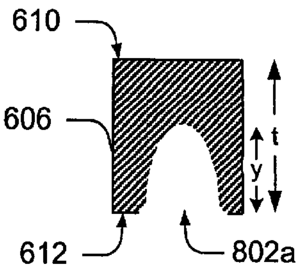

In FIGS. 9*a* and 9*b* substrate material has been removed to form a trench 802*a* through the second surface 612. In this embodiment, sand drilling was utilized, though as described above, other techniques can form a satisfactory trench.

Figure 9C:
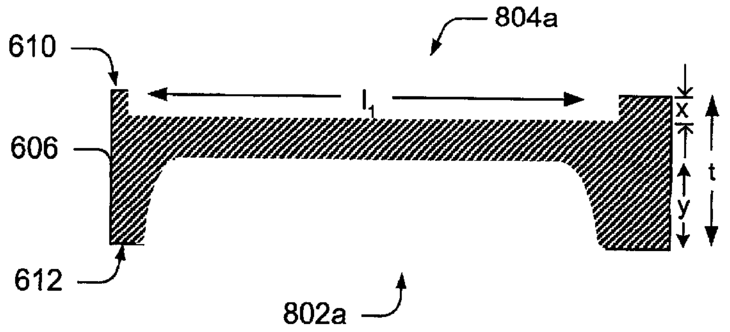
Figure 9D:
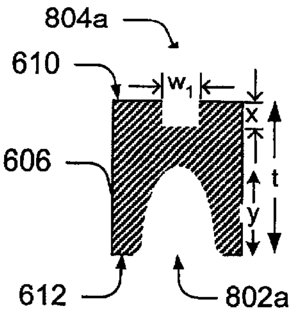

In this embodiment, FIGS. 9*c*–9*d* show a partially formed second trench 804*a* formed by laser machining from the first side 610. The second trench 804*a* has length $l_1$ and width $w_1$.

Figure 9E:
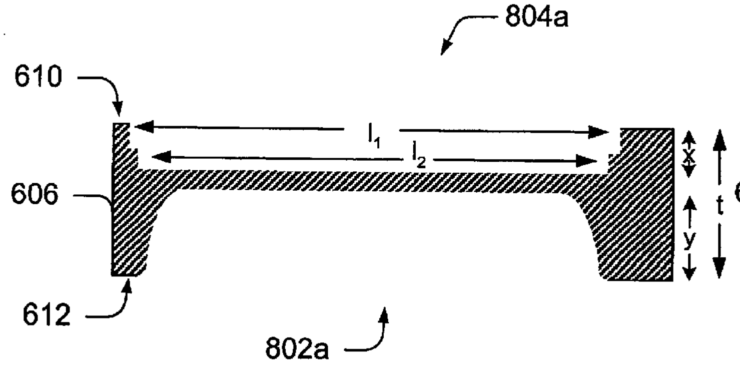
Figure 9F:
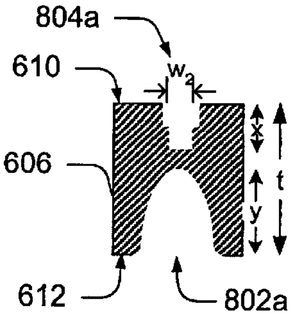

In the embodiment of FIGS. 9*e*–9*f*, the laser beam has removed additional material from the first surface of the substrate. In this embodiment, this second laser removal step has increased the depth x of the trench 804*a*. In this embodiment, the newly removed portion has a length $l_2$ and width $w_2$ each of which are less than $l_1$ and $w_1$ of FIGS. 9*c*–9*d*. These changes in trench dimensions can be achieved by, among other things, changing the pattern or footprint that the laser beam traces on the substrate. Various other configurations will be discussed in more detail below.

Figure 9G:
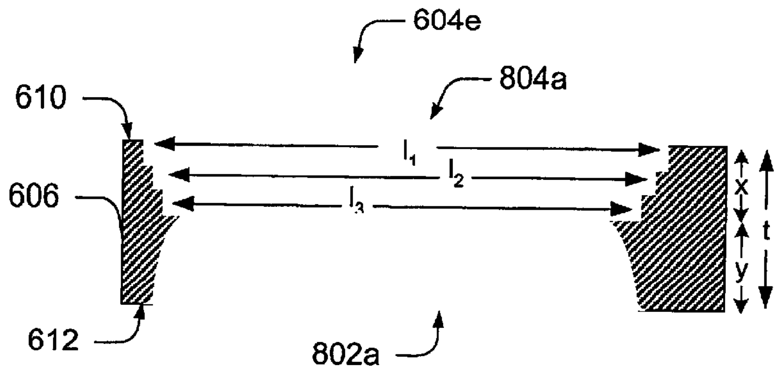
Figure 9H:
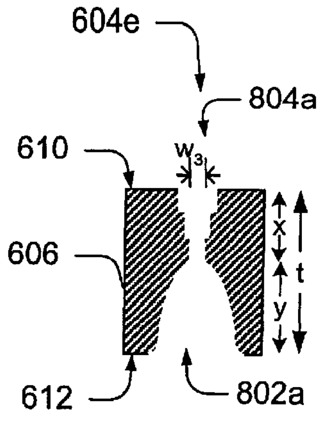

FIGS. 9*g*–9*h* show the results where the laser beam has removed additional substrate material from the thin film side to form a finished trench 804*a* and a slot 604*e*. This technique has created a stair step configuration or pattern as can be seen in the alternating vertical and horizontal surfaces comprising the laser machined trench in these Figs.

Though only three distinct stair steps are shown, other exemplary embodiments can have any number of steps or graduations. In some exemplary embodiments, the number of graduation can be such that individual steps become almost imperceptible.

FIGS. 10*a*–10*e* show another exemplary embodiment utilizing a stair-step or graduated laser machined trench in a substrate having microelectronics incorporated upon it.

Figure 10A:
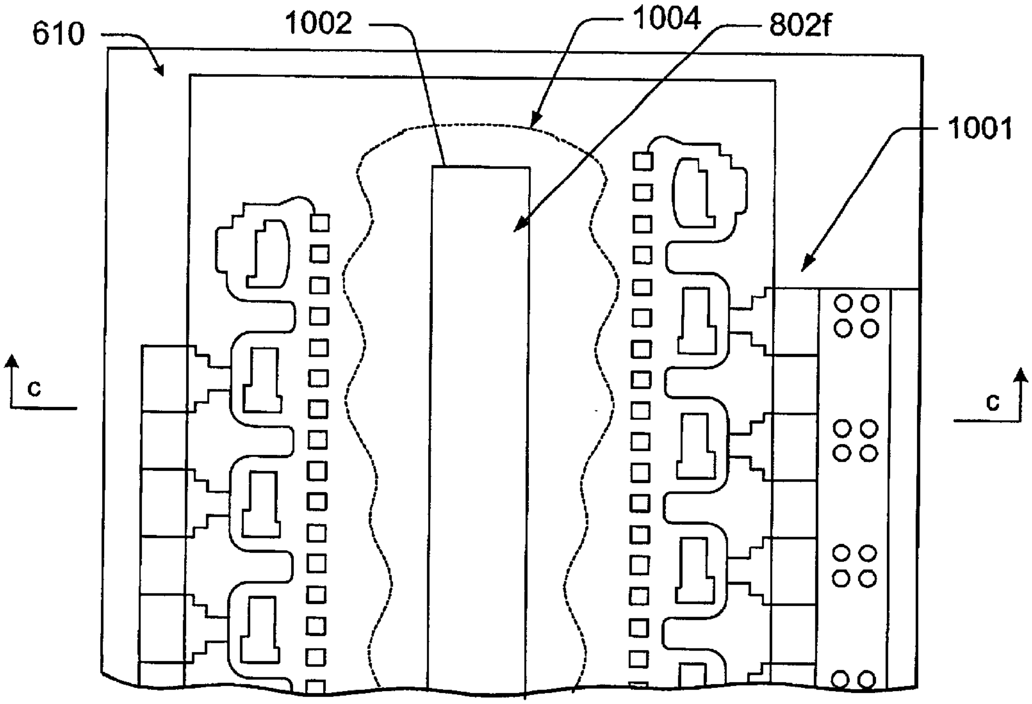
FIG. 10*a* is a top view of a print head in accordance with one exemplary embodiment.

FIG. 10*a* shows a view from above the thin film side of a substrate having microelectronics 1001 incorporated thereon, in one embodiment. A laser beam has made a first cut 1002 through the thin film surface 610 of the substrate to partially form a trench 802*f* in this embodiment. This first cut has damaged substrate material in proximity to the cut in this embodiment. This damaged or "heat affected zone" 1004 can be caused by heat and other energy from the laser beam that damages surrounding substrate material and/or microelectronics. Thus, it can be advantageous to limit the heat affected zone especially where any portion of the microelectronics is within it.

Figure 10E:
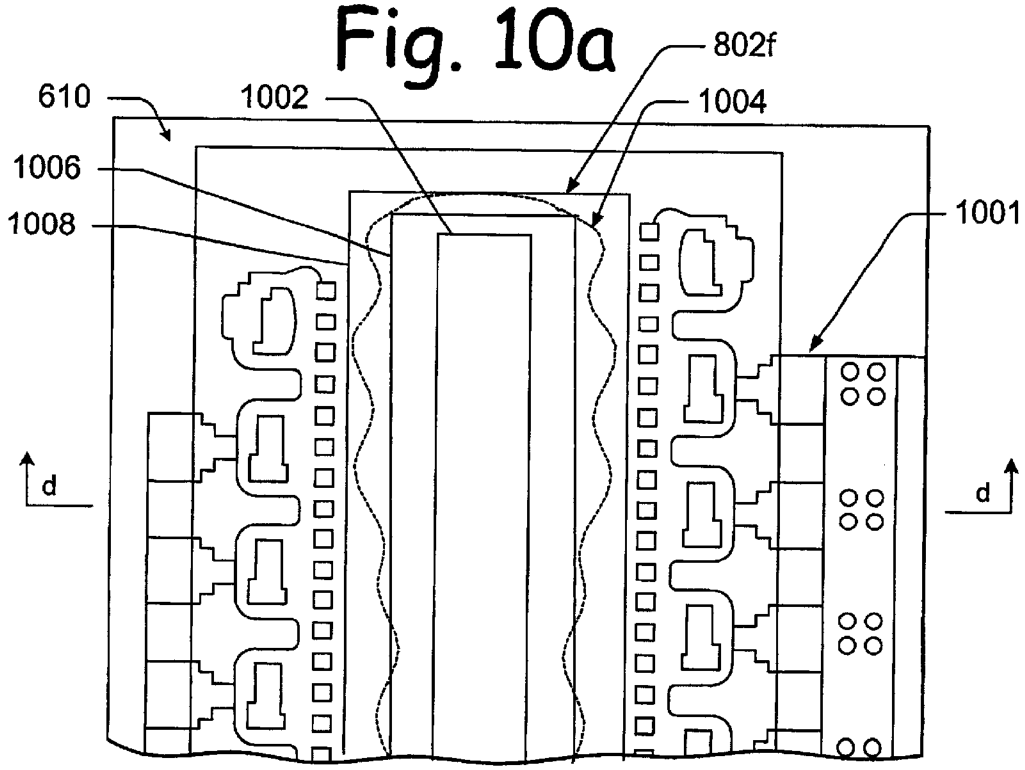
FIG. 10*e* is a top view of a print head in accordance with one exemplary embodiment.
Figure 10B:
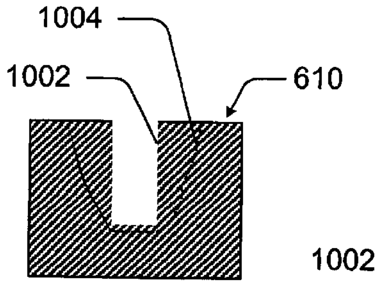
FIGS. 10*b*–10*d* each show a cross-sectional view of a substrate in accordance with one exemplary embodiment.
Figure 10C:
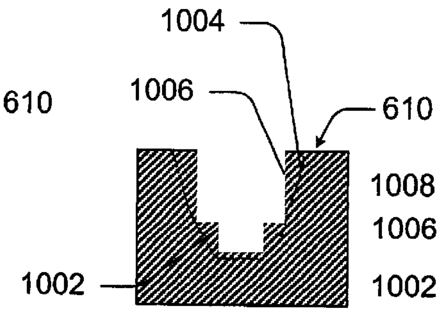

The embodiment of FIG. 10*b* shows a cross-section taken along line c—c of the substrate shown in FIG. 10*a*, and shows the relatively deep but narrow first cut 1002. As illustrated in this embodiment, the trench is generally rectangular, and in this particular embodiment, the sidewalls of the trench are generally orthogonal to the first surface 610. FIG. 10*c* is an embodiment that shows the results of a second cut 1006 that removed additional material, in a process after the formation of the substrate shown in FIG. 10*b*. It will be noticed that this second cut increased the footprint of the partially formed trench but not the depth. In this embodiment, the trench has alternating generally horizontal and generally vertical surfaces that can create a stepped configuration. This configuration can be seen from a plan view in FIG. 10*e* at a subsequent step in the process of the current embodiment as will be discussed in more detail below.

Figure 10D:
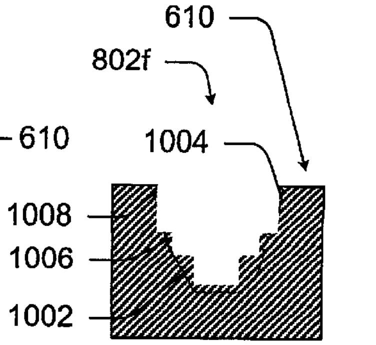

FIG. 10*d* shows a further cross-sectional view of this embodiment taken along line d—d in FIG. 10*e*. FIG. 10*d* shows the results of a third laser cut 1008. In this embodiment, this cut further increases the footprint of the trench 802*f* without increasing the depth. This embodiment further contributes to the stepped configuration by adding an additional step from the previous embodiment shown in FIG. 10*c*.

The embodiment of FIG. 10*e* returns to the top side view of FIG. 10*a* with the addition of the second and third cuts. It can be seen in the embodiments shown in FIGS. 10*d* and 10*e* that much of the heat-affected zone made by the first laser cut has been removed by the subsequent cuts.

In this embodiment, the heat affected zone caused by the first deep narrow trench did not extend into the nearby microelectronics 1001 and much of it was removed in the subsequent steps. In one embodiment, the subsequent cuts remove most of the damaged material without creating a significant additional heat affected zone, because any heat generated can dissipate into the first cut and the ambient air rather than the adjacent substrate, among other reasons.

Figure 10F:
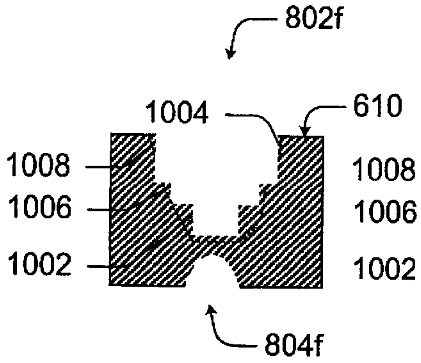
FIGS. 10*f*–10*h* each show a cross-sectional view of a substrate in accordance with one exemplary embodiment.
Figure 10G:
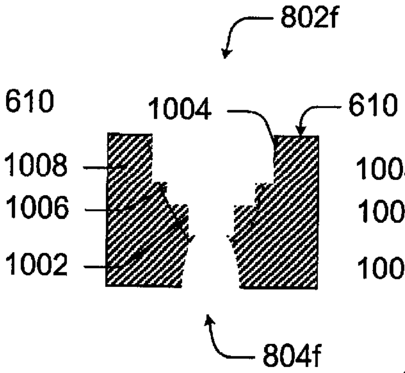

Other exemplary embodiments can remove damaged substrate material 1004 by sand drilling a second trench from the backside that intercepts the first trench associated with the damaged substrate material. This can be done alone, or in combination with the technique described above with respect to the embodiments shown in FIGS. 10*c*–10*d*. For example, FIG. 10*f* shows an embodiment of the substrate depicted in FIG. 10*d* with a second trench 804*f* partially formed from the second surface 612. FIG. 10*g* shows one embodiment of the same substrate right after breakthrough has occurred at approximately the middle of the substrate's thickness. FIG. 10*g* is an embodiment where the second trench 804*f* has generally concave walls while the first trench 804*f* has a stair step configuration.

Figure 10H:
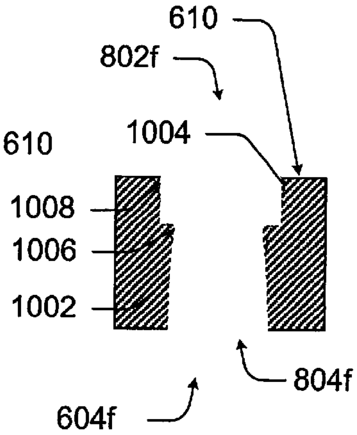

FIG. 10*h* shows an embodiment having further substrate material removed by the sand drilling process. In this exemplary embodiment, sand drilling was used to remove damaged substrate material and clean up the slot 604*f*. This embodiment can be advantageous since breakthrough occurred away from the microelectronics and thin film surface. In addition to removing damaged substrate material, the sand drilling of this embodiment was used to further configure the slot 604*f*. In this exemplary embodiment, the sand drilling process was continued after breakthrough to achieve a smoother more uniform slot. The sand drilling process can also be utilized to control the final width of the slot in another embodiment. The described embodiments can provide a slot that has an aspect ratio that is favorable relative to a slot formed by sand drilling alone. In one embodiment, this favorable aspect ratio can provide a stronger substrate and can minimize the total processing time of slot formation and thus minimize cost.

The embodiment of FIG. 10*h* can additionally be beneficial in preventing the accumulation of bubbles in the slot. The formation of bubbles can result from the fluid ejection process. An accumulation of bubbles can occlude fluid from reaching the firing chambers and hence cause printer malfunction. It can be beneficial that bubbles not remain in proximity to the inlets of the fluid feed passageways or any other region of the fluid feed slot where they could hinder or occlude fluid supply to the firing chambers.

In some embodiments, bubble accumulation has hindered previous attempts to make a front side trench that was substantially longer or wider than the backside trench that supplied it. The previously described embodiments can allow the backside trench to be shorter than the front side trench without having gas bubbles accumulate in the slot. Specifically, recall that, as shown in the embodiments FIGS. 9*a*–9*h*, the substrate is effectively upside down from the configuration in which it is commonly used. In this embodiment, the stair step configuration can eliminate areas where bubbles would otherwise tend to accumulate. Specifically, in this embodiment by having multiple narrow shelves, bubbles that tend to form during the fluid ejection process tend to migrate or disperse into the backside trench away from the thin film side.

The stair step configuration can be utilized on both the width and the length as shown in the embodiment of FIG. 10*e*. Alternatively, a stair step configuration can be used on only the length or the width. For example, a common width can be maintained for multiple laser cuts that form the first trench while the lengths are made progressively shorter or longer as desired.

The stair step or graduated configuration of the embodiment shown in FIGS. 10*g* and 10*h* are two of the possible configurations that can reduce the amount of silicon removed from the substrate thus increasing die strength and decreasing manufacturing cost and time.

In some embodiments, other configurations can also reduce bubble accumulation. These embodiments include, in addition to the stair step configuration, contoured and tapered configurations, among others. For example, FIGS. 11*a*–11*b* show an exemplary embodiment where a laser beam formed a contoured trench that can reduce bubble accumulation in the slot.

Figure 11A:
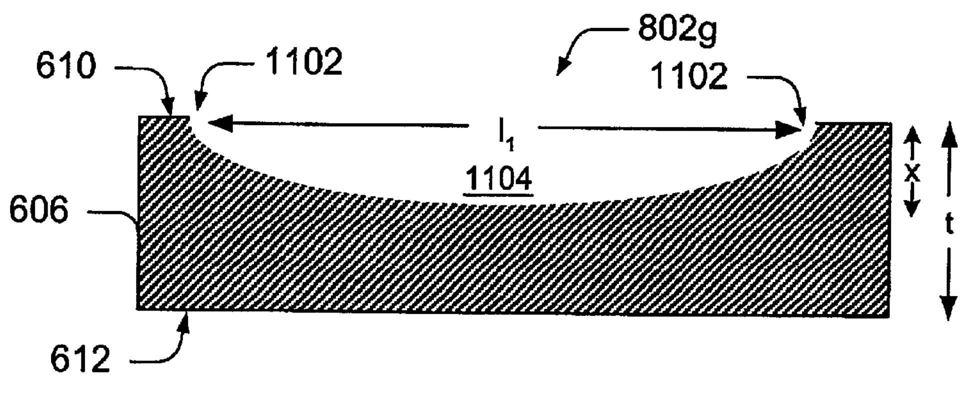
FIGS. 11*a*–11*b* each show a cross-sectional view of a substrate in accordance with one exemplary embodiment.

Referring now to FIG. 11*a*, a laser beam has formed a first contoured trench 802*g* of length $l_1$ in the thin film side 610 of the substrate 606 in this embodiment. This trench is shallowest toward its peripheral edges or region 1102 that define the borders of the trench at the thin film surface and is deeper in a central region 1104.

Figure 11B:
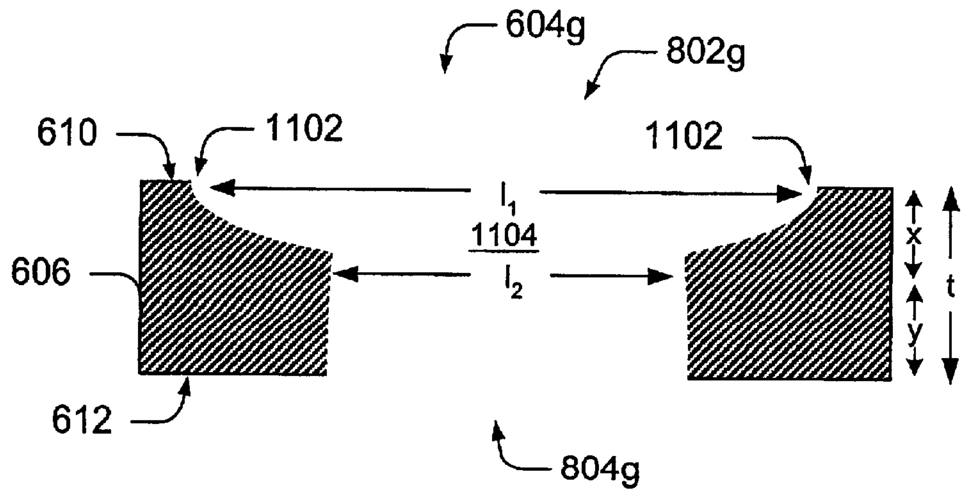

FIG. 11*b* shows an embodiment of substrate 606 that has a second trench 804*g* formed from the backside and intercepting portions of the first trench to form a slot through substrate 606. In this embodiment, the backside trench 804*g* intercepts the central region 1104 of the first trench 802*g*. In this exemplary embodiment, the first trench 802*g* has a maximum length $l_1$ that is near the first surface 610. The second trench 804*g* also has a length $l_2$ where it intercepts the first trench 802*g* in this embodiment.

When the first trench is formed on the thin film side, the contoured configuration of this embodiment can allow the backside trench to be much shorter than the thin film trench while still providing adequate fluid flow and minimizing bubble accumulation. In an exemplary embodiment, the length of the laser machined trench $l_1$ can be at least about 200 percent the length $l_2$ of second trench 804*g*.

In one embodiment, a front side trench that is significantly longer than the backside trench can allow the backside trench to be formed faster since the amount of substrate material that is removed in the longitudinal direction in forming the slot can be reduced. Additionally, since less substrate is removed, the remaining substrate of this embodiment is structurally stronger and less likely to break when incorporated into an end use product such as a print cartridge. Also, since the substrate is stronger in this configuration, the slots can be placed closer together on the substrate thus allowing for decreased material costs.

In some exemplary embodiments, the thin film trench can have a minimum depth at the peripheral edges 1102 to ensure adequate fluid flow to the various fluid feed passageways 620 and ejection chambers 622 (FIG. 7) supplied by the slot. In some exemplary embodiments, this minimum depth can be about 10 microns.

In other exemplary embodiments, the peripheral region of the thin film trench can also be configured to allow the various fluid feed passageways to be of uniform length and/or geometry from the slot to the individual firing chamber 622 (which are often staggered from each other) they supply. For example, a shelf portion of the thin film trench can be formed that provides this uniform configuration. Because laser machining is so precise, additional embodiments can provide fluid feed passageways, that though of differing lengths, are of precisely known lengths. These features can allow increased print head performance.

The contoured shape of trench 802*g* illustrated in the embodiments FIGS. 11*a*–11*b* can be achieved with many satisfactory techniques. For example, the focus of the laser beam can be adjusted so that the part of the beam striking a more central area of the slot receives greater energy than the portion striking more peripheral areas. Additionally, or alternatively, the speed at which the laser beam is passed over the substrate can be adjusted as desired. For example, the laser beam can be slowed over the central areas of substrate and sped up over the peripheral areas to create varying depths as desired.

Satisfactory embodiments of laser trenches can be made in many ways. For example, FIGS. 12*a*–*d* show an exemplary embodiment in which a stair stepped configuration is achieved by tracing the laser beam over the substrate in a multiple cookie cutter pattern. The embodiment shown in FIG. 12*a* is a view from above the first surface of a substrate, similar to FIG. 10*e*. The trench 802*h* depicted in the embodiment of FIG. 12*a* is basically a trench 1203 within a trench 1205 within a trench 1207. In one embodiment, this configuration can be achieved by passing the laser beam over the substrate following the multiple cookie cutter shapes or patterns (shown as dotted lines) 1202, 1204, and 1206. The corresponding cookie cutter shapes are shown individually in FIGS. 12*b*–12*d*.

The cookie cutter shapes shown in this embodiment are rectangular, but many other shapes including elliptical shapes can also be used. The speed of movement, intensity, and focus of the laser beam can be held constant or adjusted as desired to achieve a given configuration in alternative embodiments.

Figure 13:
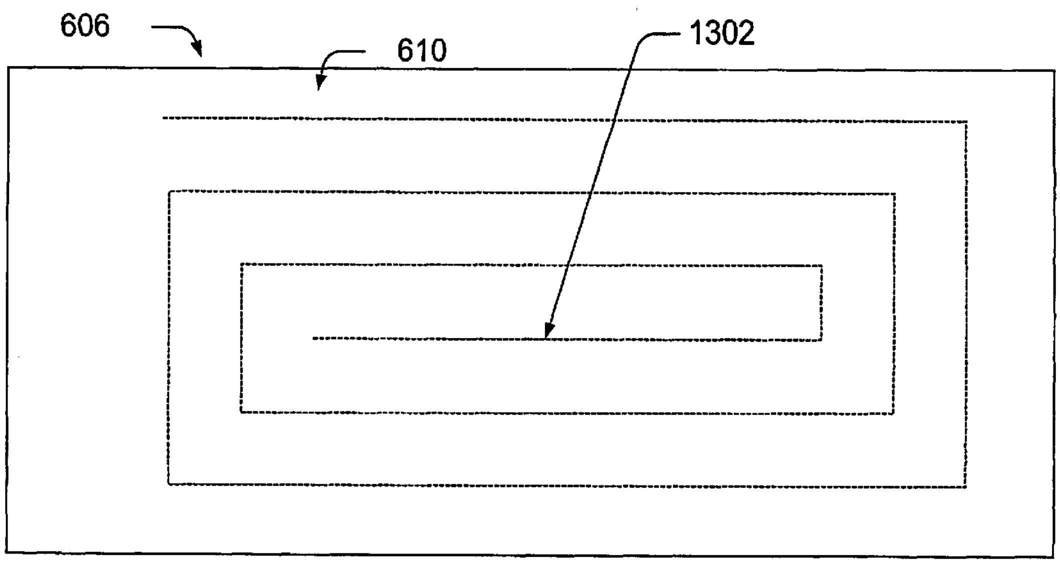
FIG. 13 is a top view of a substrate in accordance with one exemplary embodiment.

Other patterns can also be used for achieving a desired trench configuration. For example, FIG. 13 shows an exemplary laser path as dotted line 1302 on the first side 610 of the substrate 606. The laser path in this embodiment is an expanding pattern that can remove substrate in a rectangular configuration to form a first trench. Those of skill in the art will recognize other satisfactory embodiments.

Figure 14:
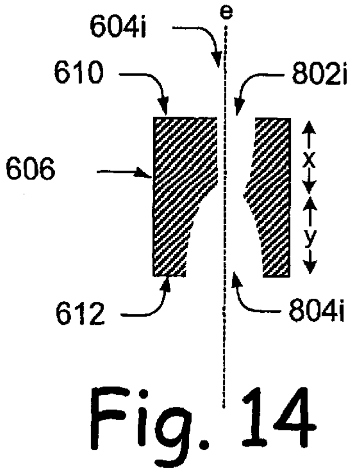
FIG. 14 is a cross-sectional view of a substrate in accordance with one exemplary embodiment.

The illustrated embodiments have been generally symmetrical; however, such need not be the case. For example, FIG. 14 is a cross-sectional view taken transverse the long axis of a trench similar to the view shown in FIG. 8*f*. This exemplary embodiment shows a cross-section of a width of a slot 604*i* that is defined by a first trench 802*i* and a second trench 804*i*. In this exemplary embodiment, the first trench is asymmetrical in the sense that relative to or about a plane into and out of the page that is orthogonal to the first surface 610 and that bisects the cross-section of the trench, the portion of the trench on the left side of the plane does not match that on the right. The described plane passes through dashed line e that is shown in FIG. 14 as a reference. It can be seen from the drawing that substantially more of trench 802*i* is on the right side of line e through which the reference plane passes than is on the left side. In this embodiment, a portion of the slot 604*i* on the left of line e is generally planar and orthogonal to the first surface, whereas a portion of the slot on the right of the line e is generally contoured.

Figure 15:
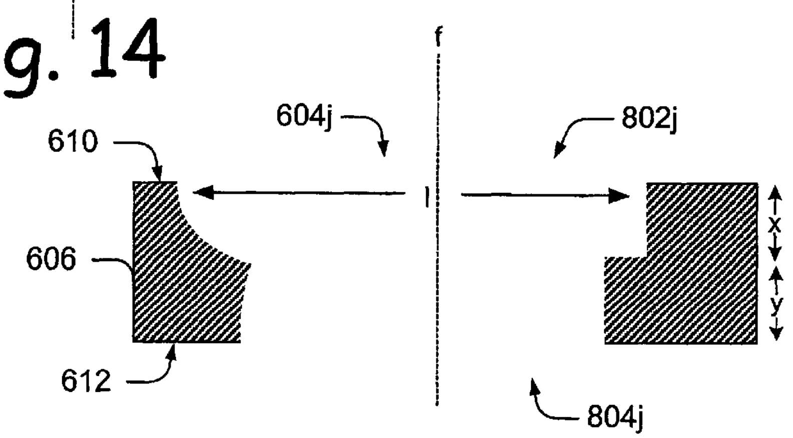
FIG. 15 is a cross-sectional view of a substrate in accordance with one exemplary embodiment.

Similarly, the embodiment of FIG. 15 shows a cross-sectional view along the long axis of the slot 604*j*. In this exemplary embodiment, the first trench 802*j* is asymmetrical in the sense that relative to or about a plane into and out of the page that is orthogonal to the first surface 610 and that bisects the cross-section of the trench, the portion of the trench on the left side of the plane does not match that on the right. Dashed line f is provided as a point of reference through which the described plane passes. In this embodiment, a portion of the slot 604*j* on the left of line f has a contoured configuration whereas a portion of the slot 604*j* on the right is generally planar and generally orthogonal to the first surface 610. Other satisfactory embodiments can comprise a combination of various areas of symmetry and asymmetry as well as offsetting the first and second trenches in relation to one another.

Conclusion

The described embodiments can provide methods and systems for forming slots in a substrate. The slots can be formed by laser machining from a first surface and removing material through the use of various techniques from a second surface. The slots can be inexpensive and quick to form and have aspect ratios higher than existing technologies. They can be made as long as desirable and have beneficial strength characteristics that can reduce die fragility and allow slots to be positioned closer together on the die.

Although the invention has been described in language specific to structural features and methodological steps, it is to be understood that the invention defined in the appended claims is not necessarily limited to the specific features or steps described. Rather, the specific features and steps are disclosed as preferred forms of implementing the claimed invention.

What is claimed is:

1. A method of forming fluid handling slots in a semiconductor substrate having a thickness defined by a thin film side and a backside comprising:

laser machining into the semiconductor substrate from the thin film side to form a first trench; and, removing semiconductor substrate material from the backside to form a second trench, wherein at least a portion of the first and second trenches intersect to form a slot through the semiconductor substrate.

2. The method of claim 1, wherein said laser machining forms a first trench at least portions of which are configured to allow bubbles to migrate away from the thin film side.

3. The method of claim 1, wherein said laser machining forms a first trench having at least some contoured surfaces.

4. The method of claim 1, wherein said laser machining comprises laser machining in multiple cookie cutter configurations.

5. The method of claim 1, wherein said laser machining comprises laser machining in an elliptical configuration.

6. The method of claim 1, wherein said laser machining forms a first trench having at least some stepped surfaces.

7. The method of claim 1, wherein said removing comprises sand drilling.

8. The method of claim 1, wherein said act of laser machining is performed before said act of removing.

9. The method of claim 1, wherein said laser machining forms a first trench that is asymmetrical.

10. The method of claim 1, wherein said laser machining comprises making multiple laser machining passes over at least some of the semiconductor substrate.

11. The method of claim 10, wherein said making multiple laser machining passes creates at least one heat affected zone in the semiconductor substrate, wherein at least portions of the at least one heat affected zone are removed by subsequent laser machining passes.

12. The method of claim 10, wherein said making multiple laser machining passes comprises making individual laser machining passes, each of the individual laser machining passes having an increased footprint relative a previous laser machining pass.

13. The method of claim 10, wherein said making multiple laser machining passes creates a contoured trench profile.

14. The method of claim 10, wherein said laser machining comprises laser machining a trench having a minimum depth of about 1 percent the thickness of the semiconductor substrate and a maximum depth of about 60 percent of the thickness of the semiconductor substrate.

15. A method of forming a fluid handling slot in a semiconductor substrate having a thickness between first and second opposing surfaces and microelectronics integrated thereon, comprising:

laser machining a first trench in the semiconductor substrate through a first surface; and, sand drilling a second trench in the semiconductor substrate through the second surface, wherein at least portions of the first and second trenches join together to form a slot having an aspect ratio of at least one.

16. A method of forming a fluid handling slot in a semiconductor substrate having a thickness between first and second opposing surfaces and microelectronics integrated thereon, comprising:

creating, with a laser machining process, a first trench in the semiconductor substrate within one of the first and second surfaces; and, forming a second trench in the semiconductor substrate within the other of the first and second surfaces, wherein at least portions of the first and second trenches join together to form a slot, wherein the maximum width of the slot is about 50 percent or less of the thickness of the substrate.

17. The method of claim 16, wherein said forming comprises one or more of sand drilling, laser machining, dry etching, wet etching and mechanical machining.

18. The method of claim 16, wherein said forming a second trench comprises forming a trench that intercepts the entire length of the first trench.

19. The method of claim 16, wherein said forming a second a trench comprises forming a second trench that intercepts less than the entire length of the first trench.

20. The method of claim 16, wherein creating a first trench comprises creating a first trench defined by generally parallel side walls.

21. The method of claim 16, wherein said forming a second trench comprises forming a second trench defined by generally concave side walls.

22. The method of claim 16, wherein creating a first trench comprises creating a first trench that passes through about 25 percent to about 75 percent of the thickness of the substrate.

23. The method of claim 16, wherein creating a first trench comprises creating a first trench that passes through about 50 percent of the thickness of the substrate.

24. The method of claim 16, wherein the act of forming a second trench occurs after the act of creating the first trench.

25. The method of claim 16, further comprising removing debris from the substrate.

26. The method of claim 25, wherein said act of removing debris occurs prior to said act of forming a second trench.

27. A method of forming slots in a semiconductor substrate containing microelectronics, the semiconductor substrate having a thickness between a thin film side and a backside, the method comprising:

laser machining through the thin film side at least about 40 percent of the thickness of the semiconductor substrate; and, removing material from the backside of the semiconductor substrate to form in combination with said laser machining, a slot through the thickness of the semiconductor substrate.

28. The method of claim 27, wherein said laser machining comprises making multiple laser machining passes.

29. The method of claim 27, wherein said laser machining forms a first trench having a shelf portion that can supply fluid to multiple fluid feed passageways.

30. The method of claim 29, wherein the laser machining forms the shelf portion having side wall variations of less then about 7 microns from a desired position.

31. A method of forming slots in a substrate having opposing first and second surfaces comprising:

making a laser cut through either the first or second surface of the substrate sufficient to form a first trench; and, removing material through the other of the first and second surfaces of the substrate effective to form, in combination with said laser cut, a slot at least a portion of which passes entirely through the substrate, and wherein said slot has an aspect ratio greater than or equal to 1.

32. The method of claim 31, wherein said removing comprises one or more of: laser machining, send drilling, dry etching, and wet etching.

33. The method of claim 31, wherein said removing forms a second trench having a length and a width wherein the maximum width is about 300 microns.

34. The method of claim 33, wherein said removing forms a second trench having a maximum length less than about 50 percent of the length of the first trench.

35. The method of claim 33, wherein said making a laser cut forms a first trench having a shape that facilitates bubble dispersal during fluid ejection.

36. A method of forming slots in a semiconductor substrate having a thickness defined by a thin film surface and an opposing backside surface comprising:

laser machining a first trench through the thin film surface of the semiconductor substrate;

forming a second trench through the backside surface of the semiconductor substrate effective to form, in combination with said first trench, a slot at least a portion of which passes entirely through the semiconductor substrate; and, wherein said laser machining forms a trench having a minimum depth of at least about 1 percent the thickness of the substrate and a maximum depth of about 50 percent the thickness of the substrate.

37. The method of claim 36, wherein said laser machining comprises laser machining a first trench that has at least one inwardly tapered surface to allow bubbles to migrate away from the thin film surface toward the backside surface.

38. The method of claim 36, wherein said forming comprises forming a second trench having a maximum width less than or equal to about 50 percent of the thickness of the substrate.

39. A method of forming slots in a semiconductor substrate comprising:

removing material from a first side of the semiconductor substrate to form a first trench in the semiconductor substrate;

laser machining a second trench in a second side of the semiconductor substrate wherein the second trench has a region that is deeper than other regions of the trench; and, wherein at least the deeper region of the second trench intersects the first trench to form a slot.

40. The method of claim 39, wherein said removing forms a first trench having a maximum length that is less than or equal to about 50 percent of a length of the second trench.

41. The method of claim 39, wherein said act of laser machining occurs before said act of removing.

42. A method of forming a slot in a substrate comprising:

laser machining an asymmetrical trench through a first surface of the substrate; and removing material through an opposite second surface of the substrate wherein said removing intercepts at least portions of the trench to form a slot through the substrate.

43. The method of claim 42, wherein said laser machining forms an asymmetrical trench having a maximum depth at least about 20 percent of the thickness of the substrate.

44. The method of claim 42, wherein said laser machining comprises laser machining an asymmetrical trench where the asymmetry occurs about a plane orthogonal to the first surface and parallel to a long axis of the trench.

45. The method of claim 42, wherein said laser machining comprises laser machining an asymmetrical trench where the asymmetry occurs about a plane orthogonal to the first surface and orthogonal to a long axis of the trench.

* * * * *

UNITED STATES PATENT AND TRADEMARK OFFICE

CERTIFICATE OF CORRECTION

PATENT NO. : 6,979,797 B2

APPLICATION NO. : 10/061828

DATED : December 27, 2005

INVENTOR(S) : Rio T. Rivas et al.

It is certified that error appears in the above-identified patent and that said Letters Patent is hereby corrected as shown below:

In column 13, line 54, in Claim 17, after "more of" insert -- : --, therefor.

In column 14, line 34, in Claim 30, delete "then" and insert -- than --, therefor.

In column 14, line 47, in Claim 32, delete "send" and insert -- sand --, therefor.

Signed and Sealed this

Ninth Day of June, 2009

John Doll

JOHN DOLL

*Acting Director of the United States Patent and Trademark Office*